(12) United States Patent
Rivera

(10) Patent No.: US 8,559,755 B2
(45) Date of Patent: Oct. 15, 2013

(54) METHODS AND SYSTEMS FOR PRIORITIZING DIRTY REGIONS WITHIN AN IMAGE

(75) Inventor: Juan Rivera, Doral, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 853 days.

(21) Appl. No.: 12/728,729

(22) Filed: Mar. 22, 2010

(65) Prior Publication Data

US 2010/0254603 A1  Oct. 7, 2010

Related U.S. Application Data

(60) Provisional application No. 61/167,248, filed on Apr. 7, 2009.

(51) Int. Cl.
*G06K 9/36* (2006.01)

(52) U.S. Cl.
USPC .......................................... 382/276; 345/418

(58) Field of Classification Search
None
See application file for complete search history.

(56) References Cited

U.S. PATENT DOCUMENTS

| | | | | |
|---|---|---|---|---|
| 5,838,362 | A * | 11/1998 | Furuya et al. | 725/92 |
| 5,854,850 | A * | 12/1998 | Linford et al. | 382/128 |
| 6,874,009 | B1 * | 3/2005 | Tuli | 709/203 |
| 6,891,973 | B1 * | 5/2005 | Atsumi et al. | 382/232 |
| 7,133,155 | B2 * | 11/2006 | Patton et al. | 358/1.9 |
| 7,360,230 | B1 | 4/2008 | Paz et al. | |
| 7,733,548 | B2 * | 6/2010 | Makino et al. | 358/520 |
| 8,253,732 | B2 * | 8/2012 | Hamill et al. | 345/419 |
| 2007/0182728 | A1 | 8/2007 | Fujimori | |
| 2007/0271503 | A1 * | 11/2007 | Harmon et al. | 715/512 |
| 2009/0016647 | A1 * | 1/2009 | Hamaguchi | 382/305 |
| 2009/0210817 | A1 * | 8/2009 | Schmieder et al. | 715/781 |
| 2011/0102443 | A1 | 5/2011 | Dror et al. | |

OTHER PUBLICATIONS

PCT/US2010/029734, Written Opinion of the ISA, Oct. 2011.
PCT/US2010/029734, International Search Report from ISA, Oct. 2011.
International Preliminary Report on Patentability on PCT/US2010/029734 dated Oct. 20, 2011.

* cited by examiner

*Primary Examiner* — Manav Seth
(74) *Attorney, Agent, or Firm* — Foley and Lardner LLP; John D. Lanza

(57) ABSTRACT

A method for identifying modified sections of a drawing region and selecting at least one modified drawing region section to transmit to a remote computer. A local computer can execute a prioritization module that can identify a first modified drawing region section and a second modified drawing region section. Each of the first and second modified drawing region section can have a corresponding priority. The prioritization module can determine whether the first priority of the first section is greater than the second priority of the second section and can select the greater priority. The local computer can then transmit the selected modified drawing region section that has the greatest priority to a remote computer that communicates with the local computer over a virtual channel.

34 Claims, 10 Drawing Sheets

METHODS AND SYSTEMS FOR PRIORITIZING DIRTY REGIONS WITHIN AN IMAGE

RELATED APPLICATIONS

This U.S. Patent Application claims priority to U.S. Provisional Patent Application Ser. No. 61/167,248, filed on Apr. 7, 2009, the disclosure of which is considered part of the disclosure of this application and is herein incorporated by reference in its entirety.

FIELD OF THE DISCLOSURE

This disclosure relates generally to remotely providing graphics. More specifically, this disclosure relates to prioritizing dirty regions identified within graphics content.

BACKGROUND OF THE DISCLOSURE

Transmitting graphics and images from one computer to another can be a resource intensive process. The process becomes even more resource intensive when the graphics are three-dimensional graphics or other resource-intensive graphics. There exist many different systems and processes for transmitting or streaming resource-intensive graphics, however, many of them sacrifice quality or end-user experience for the ability to transmit the graphics from one computer to another. Systems for transmitting two-dimensional or less-resource-intensive graphics often fail to provide the computing resources required for enhanced graphics. Such enhanced graphics requirements can include the increased computing resources needed to both render and transmit three-dimensional graphics, the complexity of rendering a two-dimensional representation of a three-dimensional image, and other such requirements.

There exist systems that can be used to transmit a two-dimensional or three-dimensional graphic from one computer to another. Some of these systems can reduce the amount of graphical data transmitted from computer to another by transmitting only the dirty regions of an image, i.e. the regions of an image that have changed over a period of time. While this method may reduce the amount of graphical data that is transmitted, redundancies can exist in the sense that the same dirty region can be transmitted twice. Furthermore, these methods typically capture and transmit all dirty regions. The volume of dirty region data can, in some instances be so large, that the amount of graphical data transmitted from one machine to another is not substantially reduced. Thus, there is a need to prioritize the graphical data sent from one machine to another to further reduce the amount of graphical data transmitted over a communication channel.

SUMMARY OF THE DISCLOSURE

In its broadest interpretation, this disclosure describes methods and systems for prioritizing detected dirty regions within one or more graphics. When an application generates a large number of dirty regions or dirty regions that include a large amount of graphical data, the amount of graphical data may still be too great to transmit. In one instance, the methods and systems described herein can be used to further reduce the amount of graphical data by prioritizing the dirty regions. Prioritizing and managing the transfer of dirty region content from one machine to another can further reduce the amount of data sent in response to a screen update thereby increasing the speed at which the dirty region content is delivered from one machine to another. The present disclosure describes methods and systems for prioritizing dirty regions detected within an image frame. Prioritization of the dirty regions can involve evaluating a set of characteristics associated with a particular dirty region and further determining, generating or identifying a prioritization number or value associated with a particular dirty region. The characteristics evaluated can include: the type of application generating the graphical content; the user accessing the application; the file being operated on by the application; the time or date; the amount of other applications executing on the server or first machine; which window has focus; a preset prioritization value; the position of the mouse or other pointer or similar input device on the screen; and any other characteristic able to be used to determine a priority. Once a priority is determined, that priority is compared against one or more other priorities, and a determination is made as to which dirty regions should be sent to the client. By prioritizing the detected dirty regions according to prioritization parameters, values or scores, a computing machine can send over only those dirty regions having a priority greater than or less than a predetermined threshold. In other embodiments, a computing can send over those dirty regions having a particular type of priority. By transmitting only those dirty regions having a particular priority, less bandwidth is used to transmit dirty regions from one machine to another therefore it takes less time for a dirty region or screen update to transmit from one machine to another because it uses less bandwidth.

In one aspect, described herein is an embodiment of a method for identifying modified sections of a drawing region and selecting at least one modified drawing region section to transmit to a remote computer. A prioritization module executing on a local computer, identifies a first modified drawing region section that is generated by a first application. The prioritization module also identifies a second modified drawing region section, the second modified drawing region section generated by a second application. The prioritization module can also determine whether a first priority corresponding to the first modified drawing region section is greater than a second priority corresponding to the second modified drawing region section. In some aspects, the prioritization module selects, in response to the determination of the priorities, either the first modified drawing region section or the second modified drawing region section, where the selected modified drawing region section corresponds to the greater of the first priority and the second priority. The local computer then transmits the selected modified drawing region section to a remote computer communicating with the local computer.

In some embodiments, the prioritization module identifies a first modified drawing region section that is displayed in a first window, and a second modified drawing region section that is displayed in a second window. The prioritization module, in some embodiments, then determines whether the first priority is greater than the second priority by determining whether the first window or the second window has focus.

In other embodiments, the prioritization module identifies a first modified drawing region section that is displayed on a first display device, and a second modified drawing region section that is displayed on a second display device. The prioritization module, in some embodiments, then determines whether the first priority is greater than the second priority by determining whether the first display device or the second display device has focus.

In still other embodiments, the prioritization module identifies a first modified drawing region section of a drawing region, and a second modified drawing region section of the drawing region. In some embodiments, the drawing region comprises a desktop.

The prioritization module, in some embodiments, intercepts a drawing command generated by the first application, the drawing command comprising information about the first modified drawing region section. In other embodiments, the prioritization module uses the drawing command information to identify a location of the first modified drawing region section within a drawing region.

In one embodiment, the selected modified drawing region section is streamed to the remote computer.

In another aspect, described herein is an embodiment of a system for identifying modified sections of a drawing region and selecting at least one modified drawing region section to transmit to a remote computer. The system can include a first modified drawing region section that is generated by a first application and that has a first priority, and a second modified drawing region section that is generated by a second application and that has a second priority. In some aspects the system can include a prioritization module that executes on a local computer to identify the first modified drawing region section and the second modified drawing region section, and determine whether the first priority is greater than the second priority. The prioritization module can also select one of the first modified drawing region section and the second modified drawing region section, where the selected modified drawing region section corresponds to the greater of the first priority and the second priority, and transmit the selected modified drawing region section to a remote computer communicating with the local computer.

DETAILED DESCRIPTION OF THE DRAWINGS

The following figures depict certain illustrative embodiments of the methods and systems described herein, where like reference numerals refer to like elements. Each depicted embodiment is illustrative of the methods and systems and not limiting.

DETAILED DESCRIPTION

Figure 1A:
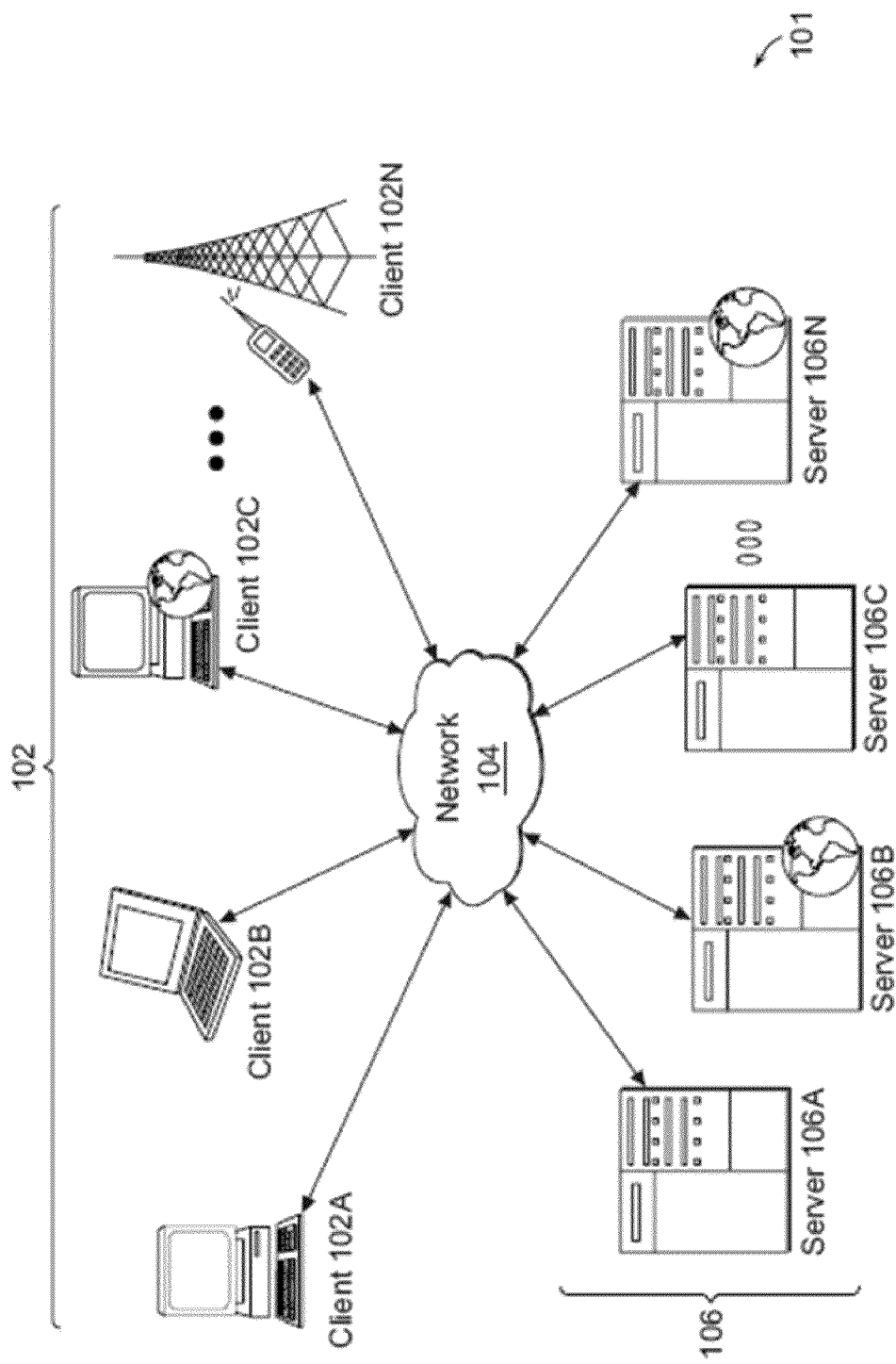
FIG. 1A is a block diagram illustrative of an embodiment of a remote-access, networked environment with a client machine that communicates with a server.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
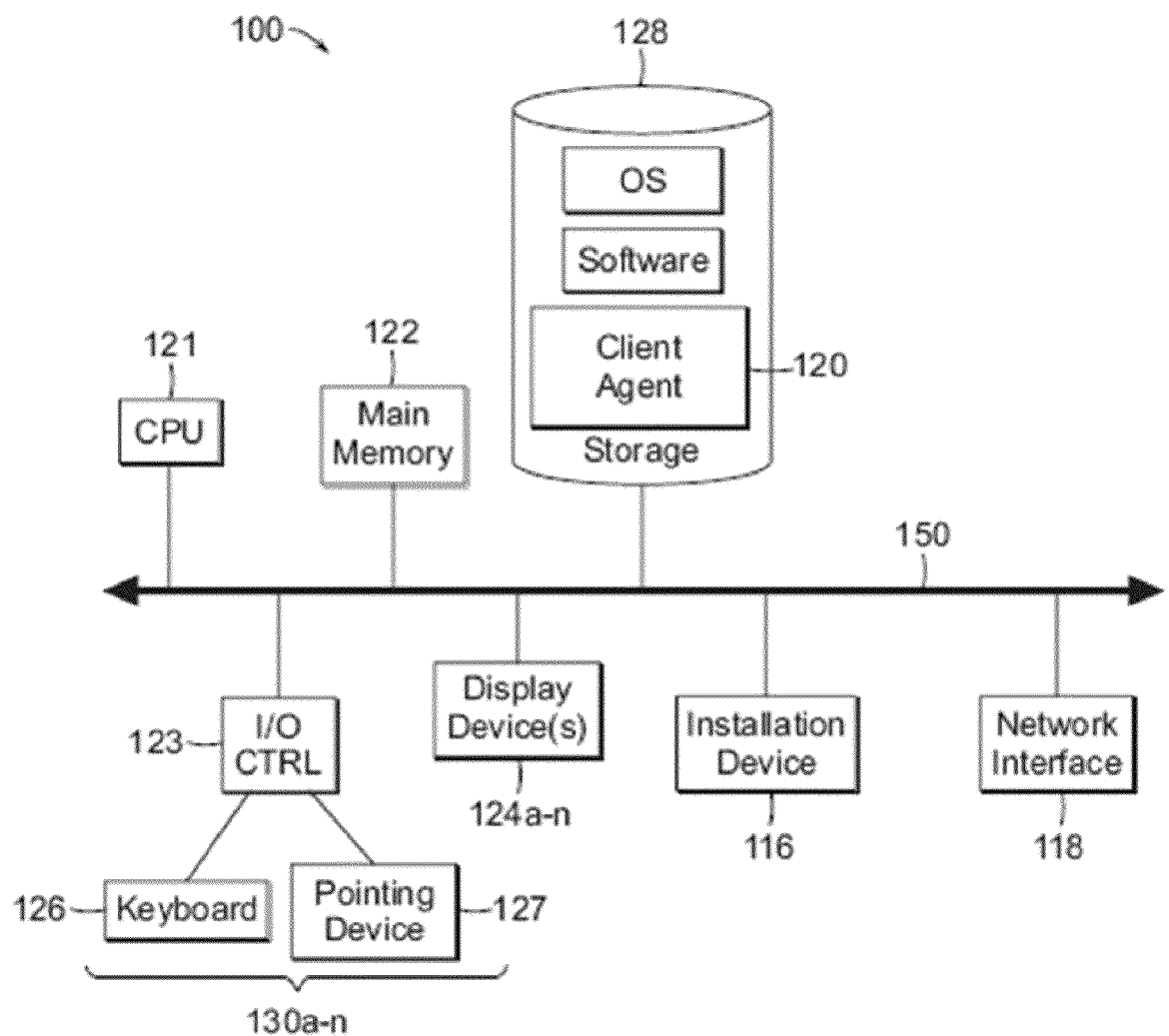
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
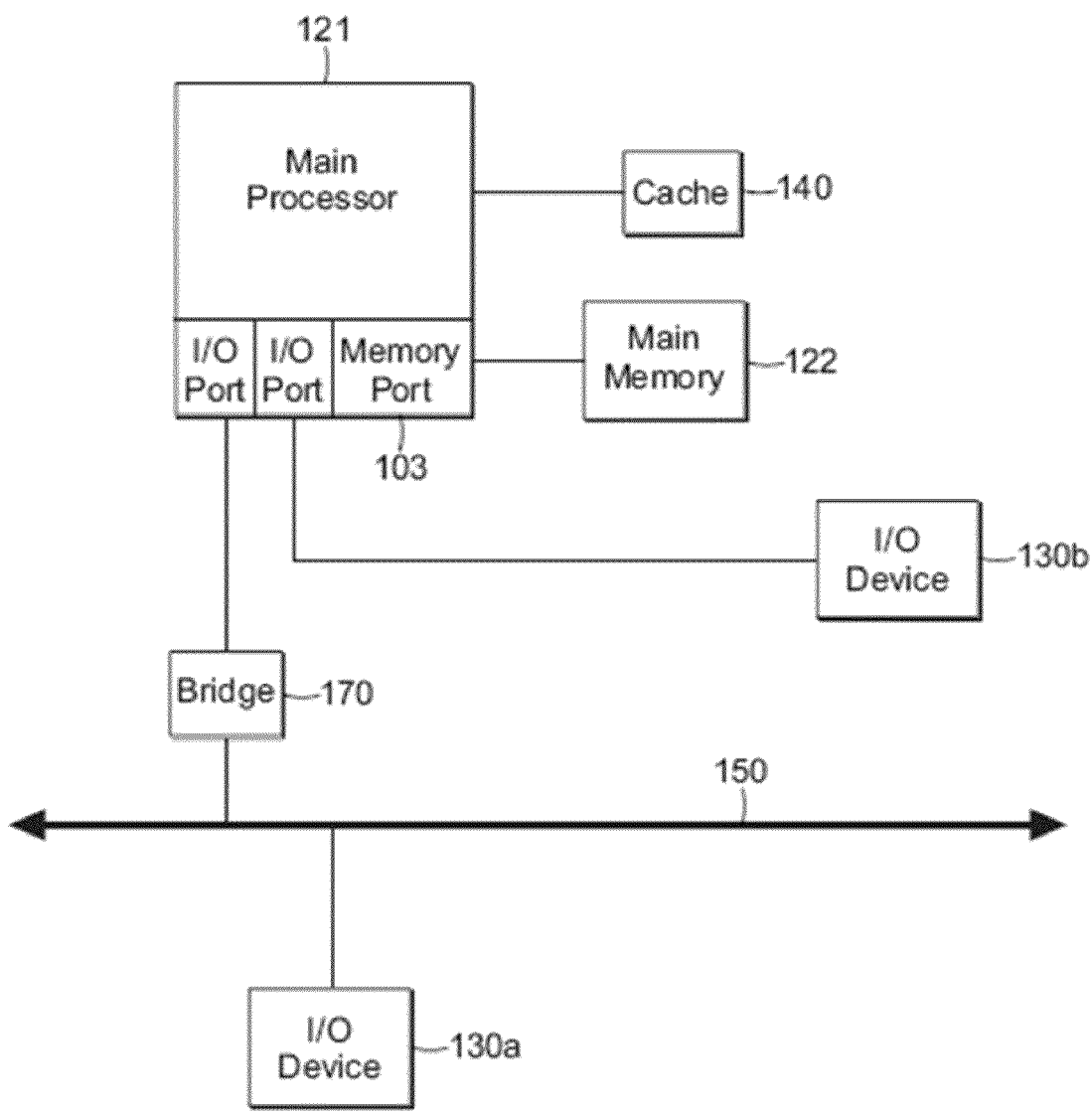

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2:
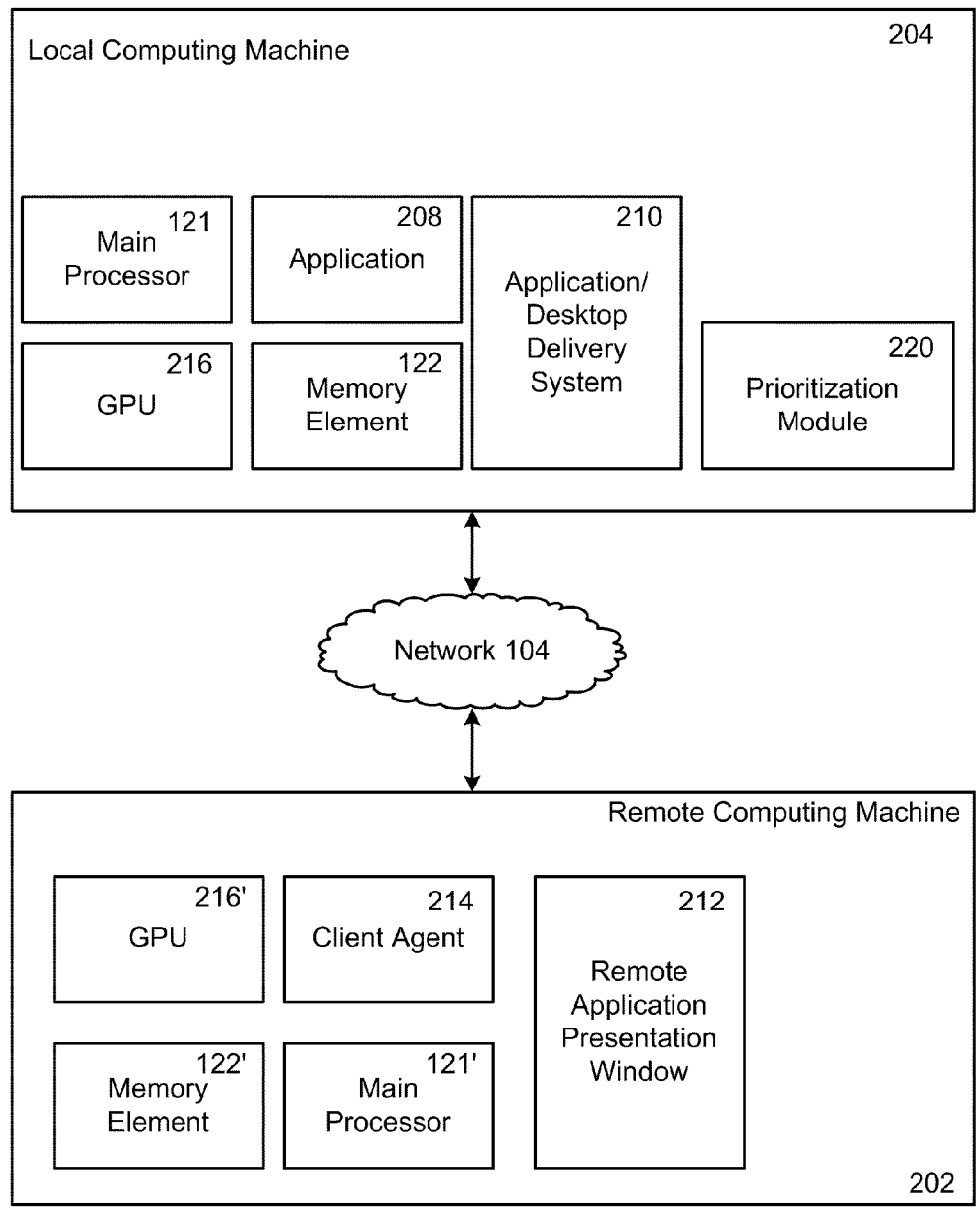
FIG. 2 is a block diagram illustrative of an embodiment of a system for remoting three-dimensional graphics.

Illustrated in FIG. 2 is one embodiment of a system for transmitting graphics from a local computer 204 to a remote computer 202. The system can include a local computing machine 204 and a remote computing machine 202, where each computer can include any of the following hardware or software elements: a main processor 121, 121'; a graphical processing unit 216, 216'; and a memory element or repository 122, 122'. In some embodiments, the local computing machine 204 can execute one or more applications 208, an application or desktop delivery system 210, and a prioritization module. In other embodiments, the remote computing machine 202 can execute a client agent 214, a remote application presentation window 212, a combining agent 224 and a decoder 226. The local machine 204, in some embodiments, can communicate with the remote machine 202 over a network 104.

Referring to FIG. 2, and in more detail, in one embodiment the local computing machine 204 and the remote computing machine 202 can be any computing device 100 described herein. In another embodiment, the local computing machine 204 can be a server 106 while the remote computing machine 202 can be a client 102. The local computing machine 204 can be referred to as any of the following: local computer; server; computer; computing device; machine; first computing device; second computing device; or any other similar phrase. The remote computing machine 202 can be referred to as any of the following: remote computer; client; computer; computing device; machine; first computing device; second computing device; or any other similar phrase. In some embodiments, the local computing machine 204 and the remote computing machine 202 communicate over a communication channel established over the network 104. Each computing machine can communicate with the other computing machine using a presentation level protocol. In some embodiments, this protocol can be the ICA protocol developed by CITRIX SYSTEMS INC.

While FIG. 2 illustrates a system where the local computer 204 communicates directly with the remote computer 202 over a network 104, in other embodiments the local computer 204 can communicate with the remote computer via an intermediary. In some embodiments, the local computer 204 can communicate with the remote computer 202 via an appliance, a proxy server or any other intermediary computer or appliance. In still other embodiments, the local computer 204 can communicate with the local computer 204 through more than one intermediary device, application or network node.

Each of the local computing machine 204 and the remote computing machine 202 contain a: memory element 122, 122'; main processor 121, 121'; and a GPU 216, 216'. The memory element 122, 122' and the main processor 121, 121' can be any of the memory elements and processors described herein. The GPU (Graphical Processing Unit) can in some embodiments be a hardware component dedicated to processing graphics commands, while in other embodiments, the GPU can be a set of executable commands, or executable program able to process graphics commands. In some embodiments, the local computing machine 204 and the remote computing machine 202 may include a three-dimensional graphics library (not shown) such as those libraries provided by the following application interfaces: DIRECTX, DIRECT3D, OPEN GL, 3DNOW, GDI, and MILCORE. Embodiments where a graphics library is included may further include a GPU 216, 216' that interfaces with the graphics library to render graphics.

While in some embodiments the GPU 216, 216' can render images using one or more graphics libraries, and using the drawing commands and images issued by an application 208, in other embodiments software associated with the graphics libraries can be used to render graphics. For example, an application that generates DirectX graphics can cooperate with a user mode driver and a graphics kernel to render the DirectX graphics commands on an available GPU. In situations where the DirectX application no longer has access to the GPU, e.g. when executing in Terminal Services, the DirectX application can use software executing in the Direct3D runtime and the kernel to render the DirectX graphics commands into image data.

In one embodiment, the local computing machine 204 executes an application 208 that generates application output. The application output can comprise graphical data that is then display on a display device connected to the local computing machine 204. Users of the remote computing machine 204 can access the application output and control the application 208 via a remote delivery system 210 that captures the application output as it is generated by the application 208 and transmits the application output to the remote computing machine 202 where it is rendered for display on a screen of a display device connected to the remote computing machine 202. The application 208 can be any of the following: a desktop; a set of commands; an application executable on a device connected to the local computing machine 204; and any other application able to be executed by the local computing machine 204. In still other embodiments, the application can be any of the following applications: CATIA; AUTOCAD; and WINDOWS MEDIA PLAYER.

The local computing machine 204, in some embodiments, can execute an application/desktop delivery system 210 that intercepts application output generated by the application 208 executing on the local computing machine 204 and transmits the application output to a remote computing device 202 where it is received by a client agent 214 executing on the remote computing device 202. The application/desktop delivery system 210 can transmit the intercepted application output over a communication channel that the application/desktop delivery system 210 establishes between the local computing machine 204 and the remote computing machine 202. Further, in some embodiments, the application/desktop delivery system 210 can transmit the intercepted application output using a presentation level protocol. In one embodiment, the application/desktop delivery system 210 receives user commands and other user-generated input from the client agent 214. Once the user commands are received by the application/desktop delivery system 210, they can be forwarded to the application 208 where they are processed.

In another embodiment, the remote computing machine 202 can execute a client agent 214 that receives graphics information and application output transmitted by the application/desktop delivery system 210 via a communication channel established between the local computing machine 204 and the remote computing machine 202 and over the network 104. Once the client agent 214 receives the graphics information and application output, the client agent 214 can, in some embodiments, send the graphics information to the GPU 216' for rendering and transmit additional information to a remote application presentation window 212 executing on the remote computing machine 202. In some embodiments, the client agent 214 can intercept user commands and other user-related data and send this data to the application/desktop delivery system 210 on the local computing machine 204. Once the data is rendered by the GPU, the resulting graphics can be displayed within the remote application presentation window 212 which can in some instances be configured to resemble the application 208 executing on the local computing machine 204.

The local computer 204, in some embodiments, can execute a prioritization module 220 that prioritizes dirty regions. In some embodiments, the prioritization module 220 uses multiple pieces of information to prioritize dirty regions in an image. By prioritizing the dirty regions, the prioritization module 220 can reduce the amount of graphics updates transmitted to a remote computer 202. The prioritization module 220 accomplishes this reduction by sending the remote computer 202 only those dirty regions that are determined to have a high priority.

Figure 3:
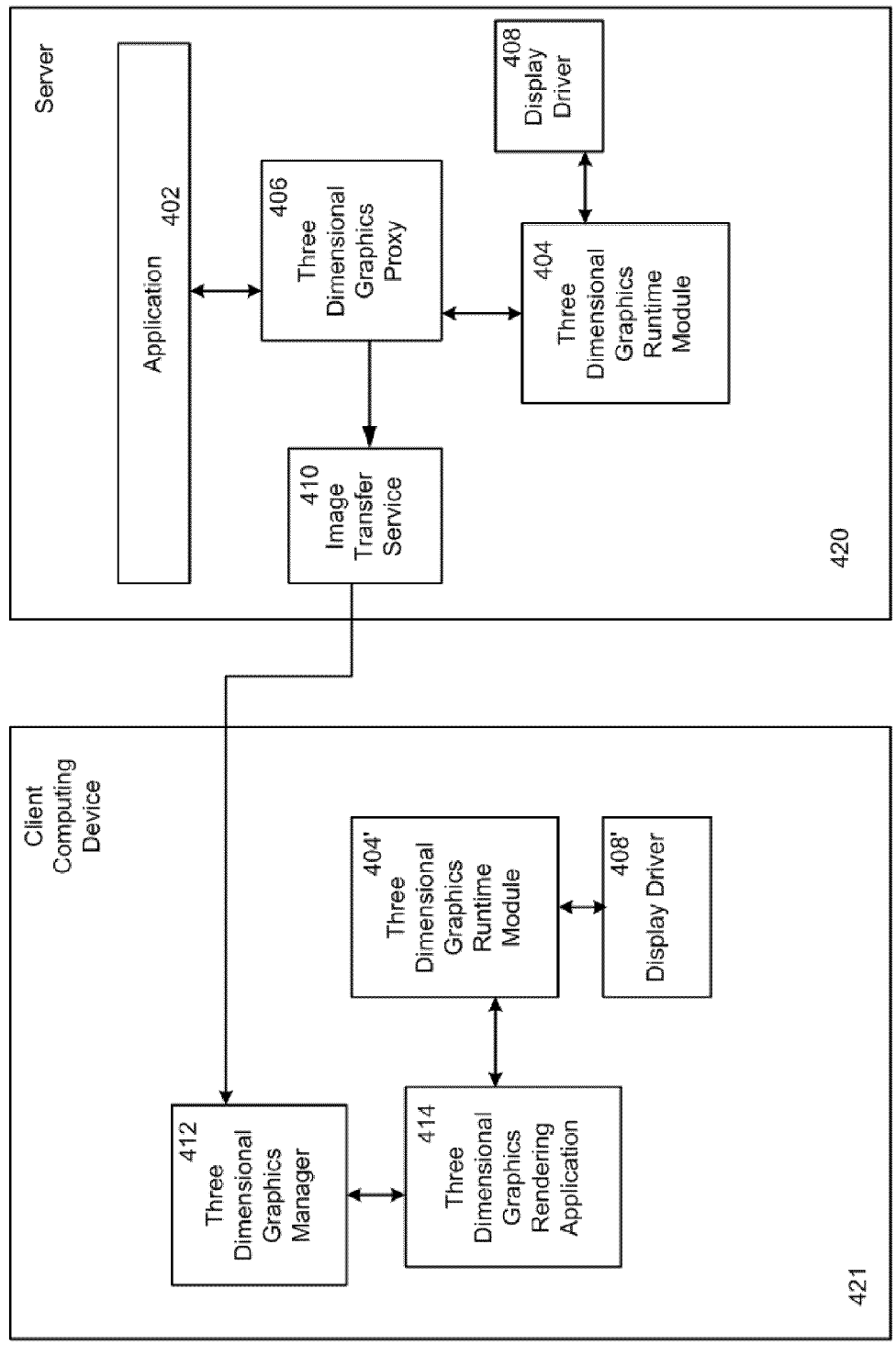
FIG. 3 is a block diagram illustrative of an embodiment of a system for remoting three-dimensional graphics.

Illustrated in FIG. 3 is an embodiment of a system that transmits three-dimensional graphics from a server 420 to a client 421 such that the three-dimensional graphics are remotely provided to the client 412. The server 420 can include an application 402 that communicates with a three-dimensional graphics proxy 406, which further communicates with an image transfer service 410 and a three-dimensional graphics runtime module 404. The three-dimensional graphics runtime module 404 can further communicate with a display driver 408. The image transfer service 410 of the server 420 can communicate with a three-dimensional graphics manager 412 executing on the client 412. A three dimensional graphics runtime module 404' can communicate with a three-dimensional graphics rendering application 414 and a display driver 408'.

Further referring to FIG. 3 and in more detail, described is an embodiment of a system that intercepts three-dimensional drawing commands and graphics, and transmits those drawing commands and graphics to a client computer 421 where they are used by a three-dimensional graphics rendering application 414 to render three dimensional images. In some embodiments, the client 421 and the server 420 can be any computer 100 described herein. Similarly, the image transfer service 410 can be an application/desktop delivery system or any application able to transmit image data from one computer to another. Each of the server 420 and the client 421 can execute a display driver 408 that can further communicate with a display device connected to either computer.

In one embodiment, both the server 420 and the client 421 can execute a three-dimensional graphics runtime module 404, 404'. The runtime module 404, 404' can be a DIRECTX, DIRECT3D or other three dimensional graphics module. In some embodiments, the runtime module 404, 404' can be an application interface that receives drawing commands and uses a drawing library to facilitate rendering images from the received drawings commands. The three-dimensional graphics runtime module 404, 404' can, in some embodiments, communicate with one or more drawing libraries including any drawing libraries described herein.

The three-dimensional graphics proxy 406 executing on the server 420 can intercept drawing commands, bitmaps and other images generated by the application 402. In many embodiments, the application 402 can transmit or forward the drawing commands and images directly to the three dimensional graphics runtime module 404 so that display images can be rendered from the transmitted drawing commands and images. In the embodiment illustrated in FIG. 3, the three-dimensional graphics proxy 406 can intercept the drawing commands and images before they are forwarded to the three dimensional graphics runtime module 404, and can forward the intercepted drawing commands and images to the image transfer service 410. Thus, in some embodiments the three-dimensional graphics proxy 406 can hook into any calls or requests made to the three-dimensional graphics runtime module 404. While in one embodiment the three-dimensional graphics proxy 406 intercepts all calls or requests issued to the three-dimensional graphics runtime module 404, in other embodiments the three-dimensional graphics proxy 406 intercepts only those calls or requests that result in the rendering of an image and display of the rendered image by the display driver 408.

The image transfer service 410, in some embodiments, can transfer the intercepted drawing commands and images to the three-dimensional graphics manager 412 on the client 421. The three-dimensional graphics manager 412 can then forward the received commands and graphics to the renderer 414 where the commands and the graphics are used to render three-dimensional images. In one embodiment, the three-dimensional graphics rendering application 414 interfaces with the three-dimensional graphics runtime module 404' to obtain graphics library information.

While FIG. 3 illustrates an embodiment of a system for remoting three-dimensional graphics, in other embodiments the system can be used to remotely provide two-dimensional graphics or any other graphics.

Figure 4:
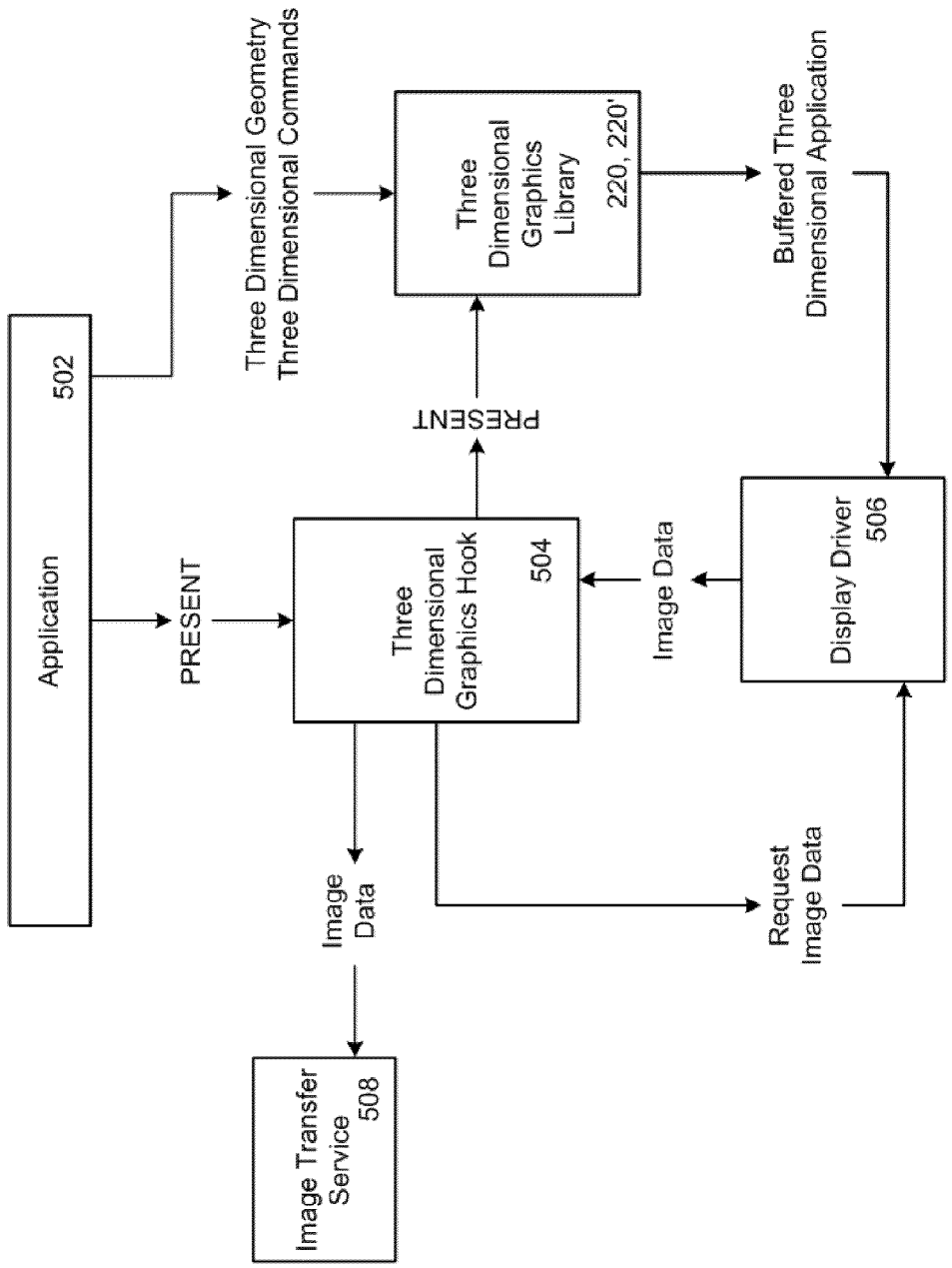
FIG. 4 is a flow diagram illustrative of an embodiment of a method for remotely providing three-dimensional graphics.

Illustrated in FIG. 4 is a flow diagram that outlines the process by which graphic commands and images on a server are transmitted to a remote computer. This system includes a substantially thin programming layer between the display driver and the application that generates the commands and images, to limit the overhead and development effort.

In one embodiment, the architecture includes an application 402 that can be a Desktop Windows Manager (DWM) module, a Windows Presentation Foundation (WPF) application that acts as a window manager, or any other similar application. The application 402 can interact with a D3D9Ex interface, and in some embodiments can render the non-client portion of an application window or the transition effects of an application window. The application 402, in some embodiments, can be an application 402 that uses Direct3D, OPEN GL or any other three-dimensional graphics API. For example, the application 402 can use Direct3D to create a desktop, where the application 402 provides the 3D geometry to render the desktop scene on a display and the application 402 drives the three-dimensional system (e.g., Direct3D system) to render the scene associated with the desktop. In such embodiments, the application 402 may have no specific function other than to act as the source of the three-dimensional geometry.

A graphics hook 504 can intercept the graphics commands and images generated by the application 502, by intercepting a Present call that causes a back buffer to be switched with a front buffer. Once the hook detects the Present call, the hook passes that call through to one or more three-dimensional Graphics Libraries 220, 220'. In some embodiments, the hook collects the window information for the application 502 and the image data from the graphics card via the display driver 506. The hook can then present both the image data and window information to the image transfer service 508.

The three-dimensional graphics hook 504 can In some embodiments, the three-dimensional Graphics Hook module 504 provides functionality related to: detecting screen updates; hooking the three-dimensional data to detect screen updates; presenting the Image Transfer Service 508 with data such as image data from the graphics card and information for the context. Also, the three-dimensional Graphics Hook module 504 provides a reliable hooking environment with limited overhead. The image collection process, via the three-dimensional Graphics Hook module 504, collects portions of the screen that are being updated through the Present call.

In some embodiments, the three-dimensional graphics library 220 can be a dynamic link library (dll), or can be a library 220 that packages the three-dimensional graphics calls into buffers for bulk transfer. In other embodiments, the display driver 506 can be an existing hardware driver on the server 420, and can facilitate the interception of the graphics commands and images generated by the application 502. The display driver 506 can facilitate the interception by permitting the three-dimensional graphics hook 504 to read graphics commands off of the graphics card of the computer on which the application 502 executes.

An image transfer service module 508 can be used to transport graphics commands and images over a virtual channel to a remote computer. In some embodiments, the image transfer service module 508 can compress, encrypt or other encode commands and images before transmitting them to a remote computer. By compressing images and commands that require a substantially large amount of computing resources and bandwidth, the image transfer service module 508 can improve frame refresh rates by reducing the level of detail in the image during animation. The final frame of the animation, or each animation section, may be determined and sent at a higher quality. In still other embodiments, the image transfer service module 508 can manage network traffic to achieve maximum frame rates or rates that meet a certain service level.

In some embodiments, the system can include a Winstation Driver module that aides in the creation of a virtual channel between a local computer and a remote computer. The virtual channel, in some embodiments, can multiplex to a single connection, and can be optimized to adhere to virtual channel priority queues.

Figure 5A:
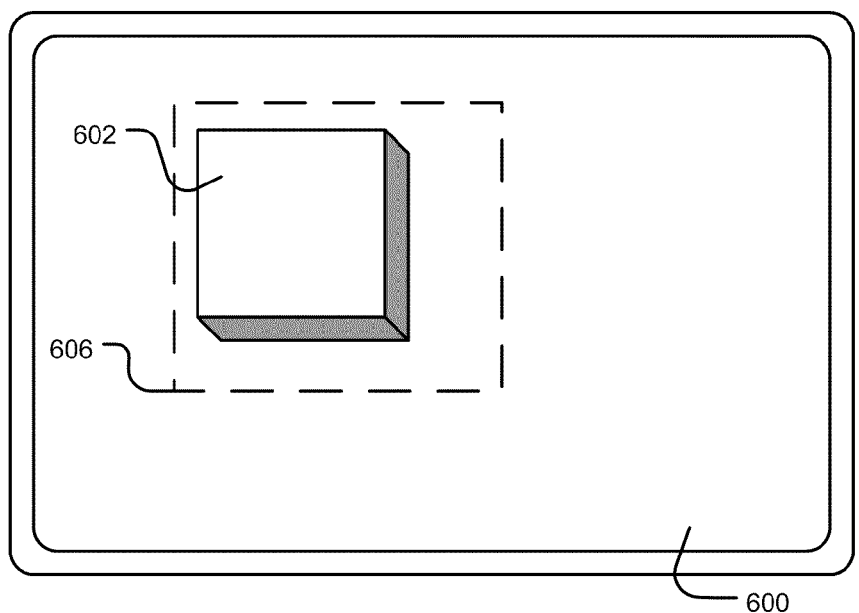
FIGS. 5A-5B are block diagrams of a screen displaying an embodiment of an image having one or more dirty regions.
Figure 5B:
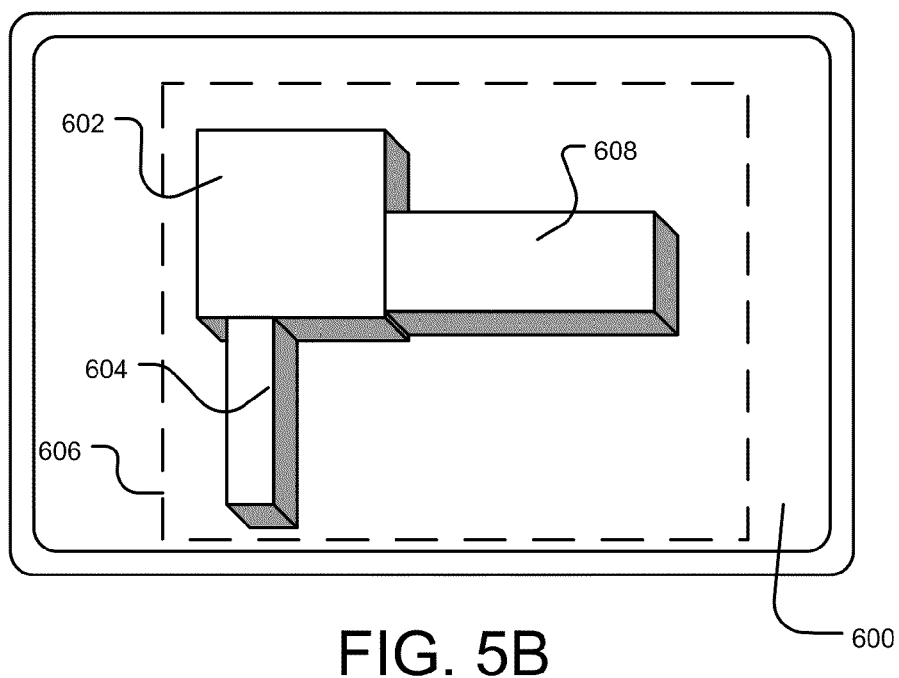

Illustrated in FIGS. 5A and 5B are embodiments of screenshots of a method for detecting a drawing region within a frame displayed on a screen 600. A frame 606 may contain a first three-dimensional FIG. 602 in a first presented bitmap in FIG. 5A. In a second presented bitmap in FIG. 5B, the frame 606 contains the first FIG. 602, a second FIG. 604 and a third FIG. 608. The second FIG. 604 and the third FIG. 608 can be drawn within a subset of the frame 606.

Referring to FIG. 5A and in more detail, the frame 606 may also be referred to as a scene, a default viewport, a canvas, an image, a bitmap, a screen, a surface, or any other descriptive term for an area where an image or graphic is drawn. Within the frame 606 may be a FIG. 602 that can include vertices, indices, shaders, textures, surfaces, or any other similar image data. In one embodiment, the figure can be a three-dimensional figure while in other embodiments, the FIG. 602 can be a two-dimensional figure.

Referring to FIG. 5B and in more detail, in one embodiment, additional images 604, 608 can be drawn within the frame 606. The images 604, 608 can be referred to as a first, second or third image, or as dirty regions. In some embodiments, multiple figures may be drawn either at the same point in time as the dirt regions 604, 608, or at different points in time. In other embodiments, one or both of the dirty regions 604, 608 can represent an image that was drawn in the frame 606 and subsequently removed. Just as the addition of an image can create a dirty region, so also the modification of an image section or the deletion of an image section can create a dirty region. Thus, the dirty regions 604, 608 can represent a newly added image, a modified image or a deleted image. Modifications to the frame 606 can include adding, modifying or deleting any of the following image elements: figures; characters; lines; and shapes or drawing elements.

The frame 606, in some embodiments, can contain sub-regions such that any combination of the images 604, 608 can exist in one or multiple frame 606 sub-regions. For example, a first image 608 can exist in a first sub-region, while a second image 602 can exist in a second sub-region. In this example, the second image 602 could have been present at one point in time. At a later point in time, the first image 608 could be added, thus creating a dirty region in the first sub-region. In this example, the dirty region can include the first image, or can include any graphics in the first sub-region that includes the new image 608.

A sub-region within a frame 606 can in some embodiments be referred to as a drawing region, a viewport, a canvas or canvas portion, a screen section, a section of the frame, a view-clipping region, a view-clipping rectangle, or any other term that is descriptive of a sub-portion of the frame 606. In some embodiments, multiple images can be added to an existing image or blank drawing frame 606. These images can be grouped within multiple non-contiguous sub-regions (not illustrated). Together these image can constitute multiple dirty regions. In other embodiments, multiple figures may be grouped within a single region such that together the images constitute a single dirty region. In some embodiments, the sub-region may be designated by a function call, such as the SetViewPort method of the DIRECT3D API developed by the Microsoft Corporation, or the glViewport method of the Open Graphics Library API (OPENGL), developed by Silicon Graphics, Inc., or any similar method or function call that may define a region or sub-region of the frame 606 of a render target.

In some embodiments, the figures 602, 604 and 608 displayed within the frame 606 can be displayed within different application windows or on different display devices. For example, a first figure 602 can be displayed in a first application window, while the second figure 608 can be displayed in the a second application window and the third figure 604 can be displayed in a third application window. In this example, each application window can display graphical output generated by an application executing on the computer. Priorities can be assigned to each figure based on whether the application window corresponding to the figure has focus or otherwise has control of the input devices. In other embodiments, priorities can be assigned to each figure based on attributes of the window, attributes of the application, alpha color values, or any other similar criteria. In another example, one or more of the figures can be displayed on multiple monitors or display devices. Computers can often connect to multiple display devices such that the desktop or graphics usually displayed on single display device, are stretched and allocated to two or more display devices. Thus, figures 602 and 604 can be displayed on a first display device, while figure 608 can be displayed on a second display device. Priorities can be assigned to each figure based on whether the corresponding display device has focus. In this example, focus can refer to which display device displays or otherwise has control over the input devices. In other embodiments, priorities can be assigned to each figure based on attributes of the display device, alpha color values or any other similar criteria.

Figure 6A:
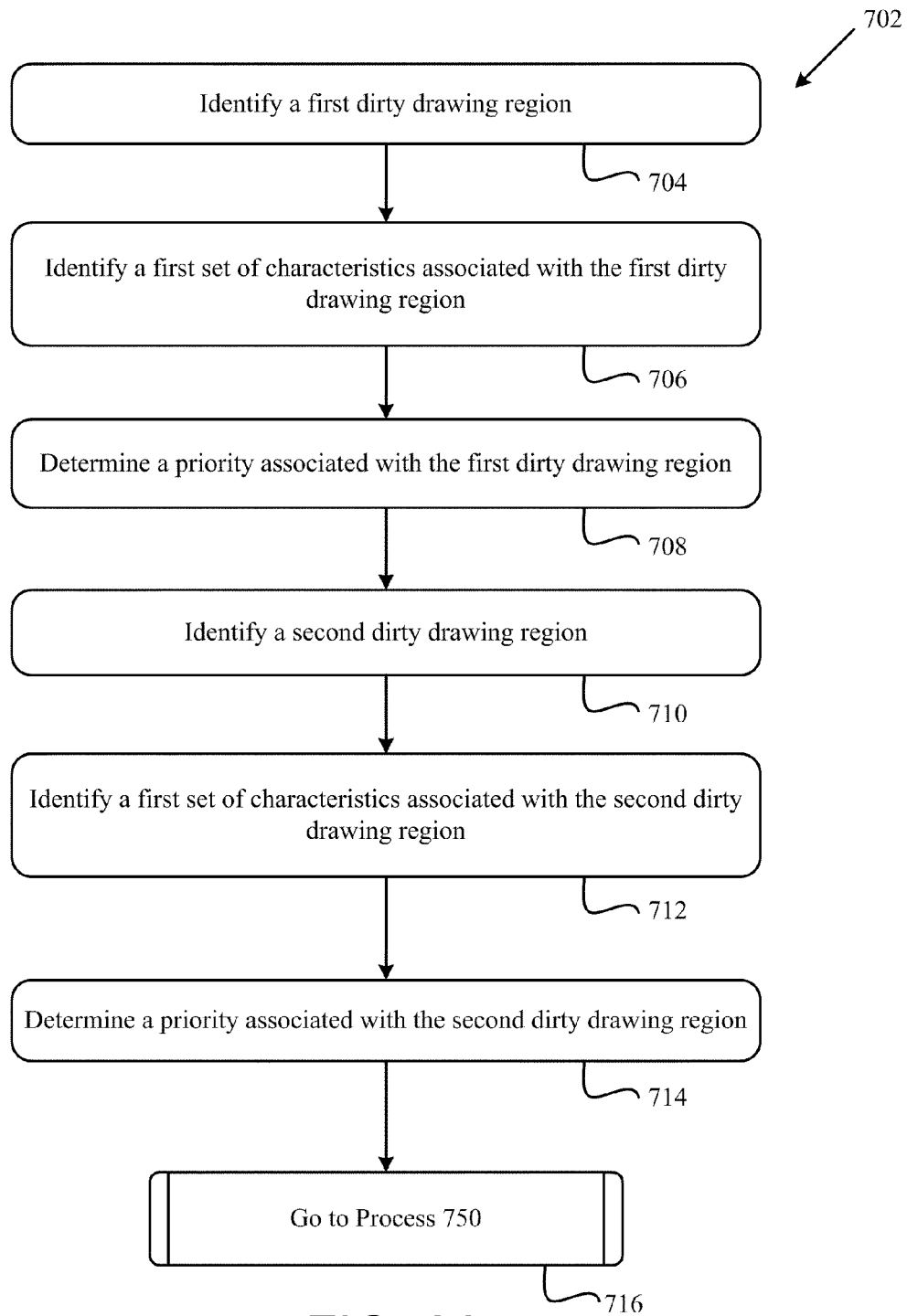
FIGS. 6A-6B are flow diagrams illustrative of embodiments of methods for prioritizing dirty regions.

Illustrated in FIG. 6A is an embodiment of a method 702 for prioritizing dirty regions. A first dirty drawing region is identified by a prioritization module or agent executing on a server or first machine (step 704), and a first set of characteristics associated with the first dirty drawing region are identified by the module or agent (step 706). In response to identifying the first set of characteristics, a determination is made regarding a priority associated with the first dirty drawing region (step 708) and a second dirty drawing region is identified (step 710). As with the first dirty drawing region, a second set of characteristics associated with the second dirty drawing region are identified (step 712) and a second priority associated with the second dirty drawing region is determined in response to identifying the second set of characteristics (step 714). A determination is then made as to whether to proceed to process 750 described in FIG. 6B (step 716).

Referring to FIG. 6A, and in more detail, a first dirty drawing region is identified by any one of a prioritization module, an agent or another program executing on a server or on a first machine (Step 704). In some embodiments, the prioritization module identifies dirty regions within a region of a frame or may identify dirty frames within an entire drawing region. A dirty region can be any region of a drawing space that is altered by: drawing additional figures; changing the color of one or more elements within the drawing space; changing the canvas size of a drawing space; altering textural elements within a drawing space; adding, deleting or otherwise editing textual elements within a drawing space; altering the resolution of a drawing space; deleting, adding or otherwise editing graphical elements within a drawing space; adding audio, video or other multimedia tags, markers or links to elements within a drawing space such that an associated audio, video or other multimedia file may become associated with a particular aspect of a drawing region; or altering the format or composition of a section of a drawing region. While the methods and systems described herein refer to a dirty region, other embodiments may refer to a dirty region as an updated section of a drawing region, a changed portion of a drawing region or an un-clean section of a drawing region, frame or canvas. In other embodiments, a dirty region can be identified by intercepting drawing commands generated by an application or by intercepting set viewport calls. Once a drawing command or set viewport call is intercepted, the information included within the command or call provides the module or client with information regarding a location within a drawing region or frame that will become dirty once the drawing command or viewport call is received by the application generating the graphics or drawing. In some embodiments the module or client can intercept the drawing commands and set viewport calls according to a pre-determined time interval, while in other embodiments the module or client can intercept the drawing commands and set viewport calls can be intercepted when the commands and calls are generated and detected by the module or client.

Once a dirty region is identified, a set of characteristics associated with that dirty drawing region is identified (Step 706, Step 712). If the dirty region is a first dirty drawing region, then a first set of characteristics associated with the first dirty drawing region can be identified (Step 706). While if a second dirty drawing region is identified, a second set of characteristics associated with the second dirty drawing region can be identified by the prioritization module, a client or any other program able to interface with the drawing or graphics generating application (Step 712). In one embodiment, the identified characteristics can include characteristics stored or comprising the drawing commands or the set viewport call generated by the application. In such an embodiment, the characteristics can include information regarding the location of the dirty region either within a frame, within a sub-region within a frame or within an area on the desktop. The characteristics can also include information regarding an image, file or application which will be affected by the creation of the dirty region. Still other characteristics may include: priority information associated with the application generating the output; information regarding the type of change to be made to the drawing region; information regarding the user, application or object generating or causing the dirty region to be generated; information regarding the position of a mouse or other pointer within a frame, drawing region or desktop; the active windows on the desktop, for example which window or object has focus; the time and date the dirty region was generated; and any other characteristics associated with the dirty drawing region. The associated set of characteristics can be used to determine a priority associated with the dirty drawing region, but can also be used to determine whether the dirty drawing region should be transmitted to a client or second computing machine or where the dirty drawing region should be transmitted. In still other embodiments, the associated set of characteristics may be used to determine whether to cache the dirty drawing region, store it in a buffer, compress the dirty drawing region or combine the dirty drawing region with another dirty drawing region or another graphics update. While the characteristics may be a part of or associated with intercepted drawing commands or set viewport calls, the characteristics may also be determined based on information gathered by the operating system or the prioritization module regarding any one of the application, the user, the time or date, the file being accessed by the application or otherwise. Additionally, the associated characteristics may be obtained from a database or other storage repository storing information about any one of: a set of drawing regions; a set of frames; the desktop; the application; files accessed by the application; the user of the client or second computing machine; the server or the first computing machine; or any other aspect of the system or prioritization scheme.

Once a dirty drawing region is identified and a set of characteristics associated with that dirty drawing region are identified, a determination must be made as to what priority can be associated with the dirty drawing region (Step 708, 714). A determination is made as to the priority associated with the first dirty drawing region (Step 708) and a determination is made as to the priority associated with the second dirty drawing region (Step 714). The determination as to what priority can be or should be associated with a dirty drawing region can in some instances be the result of an evaluation of the characteristics associated with the dirty region. Each characteristic may be assigned a value and the aggregation of those values could result in a prioritization value, metric or number. In other embodiments, the relationships of each characteristic to the other characteristics may be evaluated to determine a prioritization value or priority. The values of each characteristic can be determined from the characteristic, or may be a pre-determined value or metric that is stored in a database either within a prioritization engine or separate from the prioritization system. Sometimes, a predetermined priority value may be assigned to a dirty region, where the prioritization value or metric is either generated by the server, the application or prioritization engine or is manually entered by an administrator or user. Once a prioritization value is determined, that prioritization value is associated with or coupled to the dirty region so that a further determination can be made as to which dirty region should be sent to the client or second computing machine. Dirty regions may have different priority values or metrics, or they may have similar priority values or metrics.

Figure 6B:
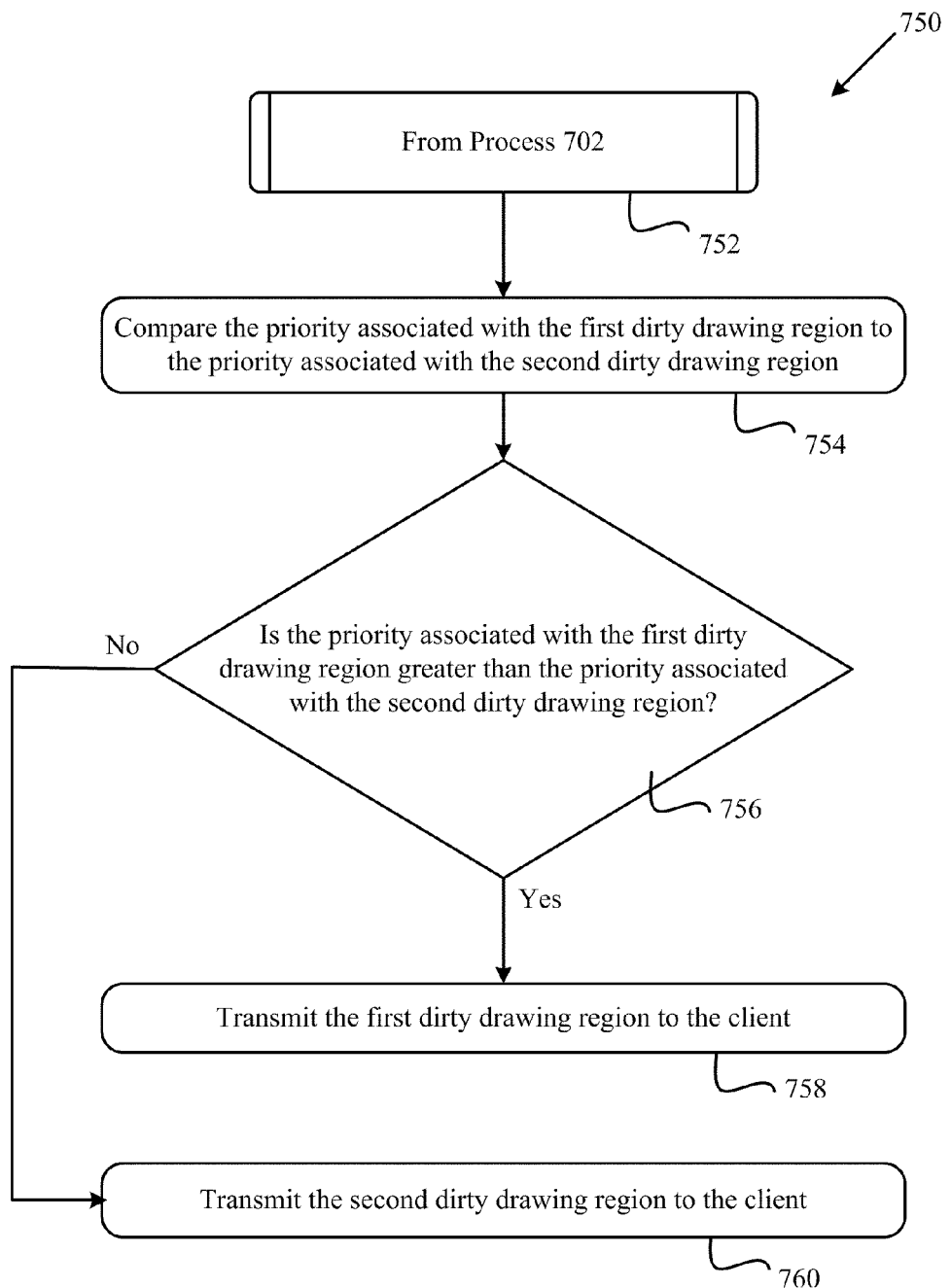

In one embodiment, the steps described in the process 702 may progress as indicated in the embodiment outlined in FIG. 6A. Other embodiments may include either combining steps in the method or performing one step before another. For example, both the first and the second dirty region may be identified at the same time, while the characteristics and the priority values may occur at the same time, or one right after the other. In some embodiments, once the priority values are determined, the process 750 described in FIG. 6B is called to further determine which dirty region to transmit to the client or second computing machine (Step 716). While the present embodiment describes process 702 and 750 as different processes, in other embodiments, the steps outlined in process 750 may be included in the process outlined in FIG. 6A and vice versa.

Illustrated in FIG. 6B is an embodiment of a method or process 750 for comparing priority values associated with dirty regions to determine which dirty region to send to a client or second computing machine. The priority values and dirty region identifications are imported from the process 702 illustrated in FIG. 6A (Step 752). Each of the imported priority values (two or more priority values) are then compared (Step 754). Once they are compared, a determination is made as to which dirty region has the greater priority value (Step 756). If the first dirty region has a higher priority value associated with it, then the first dirty region is transmitted to the client or second computing machine (Step 758). If the second dirty region has a higher priority value associated with it, then the second dirty region is transmitted to the client or second computing machine (Step 760).

Further referring to FIG. 6B and in more detail, the process 750 described in FIG. 6B can either import the information from the process 702 described in FIG. 6A (Step 752), or in some embodiments process 750 can be integrated into process 702. The information gathered by process 750 can include any combination of: an identifier associated with a dirty region; dirty region priority values or metrics; dirty region characteristics; or other information generated or gathered during the process 702 described in FIG. 6A.

The priority values, numbers, percentages or metrics determined in method 702 described in FIG. 6A are compared (Step 754) by either a priority engine, a priority module or any other program or object executing on the server or another computing machine and able to take priority values in as input and output a value representative of the comparison. This value can either be a determination as to which priority value is higher or lower, or can be a determination as to whether the priority values are the same or different, or can be a determination as to whether the priority values exceed or fall below a predetermined threshold. In one embodiment a determination is made as to which priority value or priority is greater (Step 756). This determination can, in other embodiments, align with the above-mentioned comparisons, i.e. which priority value is less, which priority value exceeds a threshold value, which priority value falls below a threshold value, whether the priority values are the same, or whether the priority values fall into particular categories or fields. While the method depicts determining which value is greater, any of the above mentioned determinations can be used by the method 750 in lieu of the depicted determination.

In some embodiments, the first dirty drawing region is transmitted to the client, the second computing machine or another computing machine or device (Step 758) only when a determination is made that the priority value associated with the first dirty drawing region is greater than the priority value associated with the second dirty drawing region. In other embodiments, the first dirty drawing region is transmitted to the client when the priority value associated with the first dirty drawing region is less than the priority value associated with the second dirty drawing region. Still other embodiments include transmitting the first dirty drawing region to the client when a determination is made that the priority value associated with the first dirty drawing region exceeds a predetermined threshold, or alternatively, that the priority value falls below a predetermined threshold. Yet other embodiments include transmitting the first dirty drawing region to the client when a determination is made that the priority value associated with the first dirty drawing region is not equal to the priority value associated with the second dirty drawing region, or alternatively, that the priority value associated with the first dirty drawing region is equal to the priority value associated with the second dirty drawing region. The dirty drawing region can be transmitted over a communication channel established between the client and the server, and it can be transmitted using the Citrix ICA protocol or any other presentation level protocol able to facilitate the transmission of dirty drawing regions from one computing machine to another. In some embodiments, the dirty drawing region may be compressed and/or encoded prior to transmission, while in other embodiments, the dirty drawing region may be coupled together with additional dirty drawing regions prior to transmission. Still other embodiment may include coupling the dirty drawing region together with drawing commands prior to transmission, such that the client receives both the dirty drawing region and commands for how to update an image with the dirty drawing region.

In one embodiment, the second dirty drawing region is transmitted to the client, the second computing machine or another computing machine or device (Step 758) only when a determination is made that the priority value associated with the second dirty drawing region is greater than the priority value associated with the first dirty drawing region. In other embodiments, the second dirty drawing region is transmitted to the client when the priority value associated with the second dirty drawing region is less than the priority value associated with the first dirty drawing region. Still other embodiments include transmitting the second dirty drawing region to the client when a determination is made that the priority value associated with the second dirty drawing region exceeds a predetermined threshold, or alternatively, that the priority value falls below a predetermined threshold. Yet other embodiments include transmitting the second dirty drawing region to the client when a determination is made that the priority value associated with the second dirty drawing region is not equal to the priority value associated with the first dirty drawing region, or alternatively, that the priority value associated with the second dirty drawing region is equal to the priority value associated with the first dirty drawing region. The dirty drawing region can be transmitted over a communication channel established between the client and the server, and it can be transmitted using the Citrix ICA protocol or any other presentation level protocol able to facilitate the transmission of dirty drawing regions from one computing machine to another. In some embodiments, the dirty drawing region may be compressed and/or encoded prior to transmission, while in other embodiments, the dirty drawing region may be coupled together with additional dirty drawing regions prior to transmission. Still other embodiments may include coupling the dirty drawing region together with drawing commands prior to transmission, such that the client receives both the dirty drawing region and commands for how to update an image with the dirty drawing region.

While the processes described in FIGS. 6A and 6B discuss obtaining information about a first and second dirty region, other embodiments may include obtaining information about multiple dirty regions. Further embodiments may also include comparing multiple priority values, where each value corresponds to one or more dirty regions.

Figure 7:
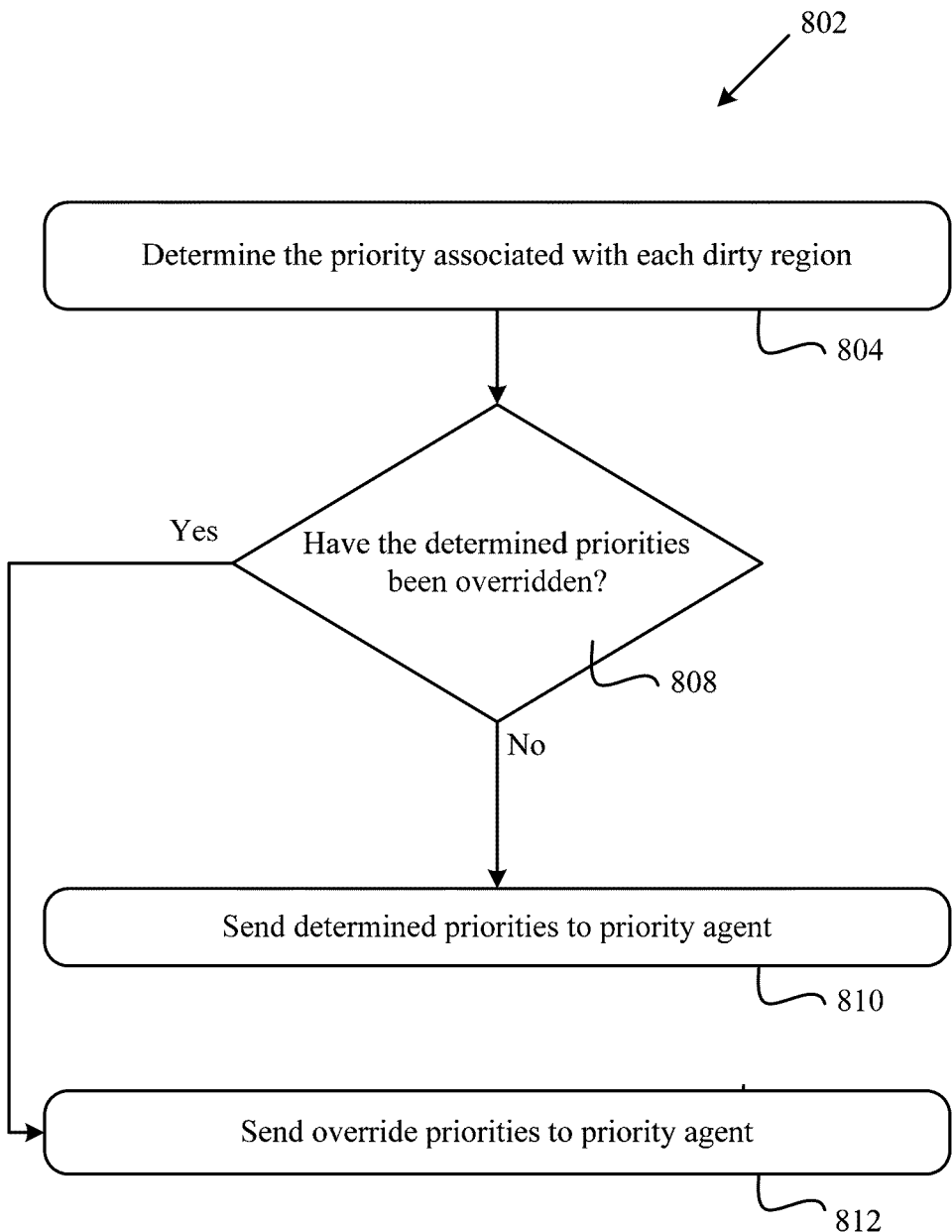
FIG. 7 is a flow diagram illustrative of an embodiment of a method for overriding a dirty region prioritization.

Illustrated in FIG. 7 is an embodiment of a method 802 for overriding a priority or multiple priorities associated with a particular dirty region. In one embodiment, a determination is made as to the priority associated with each dirty region (Step 804), a determination is then made as to whether the determined priorities have been overridden (Step 808). If the priority values have not been overridden, then the priorities are sent to the prioritization engine, agent or other program carrying out the decision as to which dirty regions should be sent to the client (Step 810). If the priority value have been overridden, then the override priorities are sent to the prioritization agent (Step 812).

Further referring to FIG. 7 and in more detail, a determination is made as to the priorities associated with the dirty regions (Step 804). In one embodiment this determination is made in the method 702 described in FIG. 6A, while in other embodiments, a separate determination is made for the purpose of determining whether the priority has been overridden. In one embodiment, the method 802 described in FIG. 7 is subsumed within the process 702 described in FIG. 6A such that the determination as to whether a priority value has been overridden occurs during the determination as to what priority value is associated or assigned to a particular dirty region. In one embodiment, the method 802 can determine whether an override value exists for all dirty regions or can make such a determination for one or a group of dirty regions at-a-time.

A determination as to whether one or more priorities have been overridden (Step 808) can be made by evaluating whether the application, remote presentation agent or another computing object indicates that a priority override value exists for a particular dirty region, window, application or section of the screen. When this occurs, it is determined that an override value exists and the current priority value is replaced with the override value. In some instances, when this determination is made, the current priority value is not replaced but rather reduced or changed into another value to indicate that the current priority value has been overridden. In other embodiments, a second priority value is increased, changed or replaced when a determination is made that a first priority value has been overridden. In one embodiment, a user can instruct the system to override one, multiple or select priority values. For example, the user may instruct the program to always send dirty regions associated with Microsoft Word in lieu of dirty regions associated with the desktop. Still other embodiments include hard-coded priority override instructions that can be included in the priority engine or agent and that are applied each time a particular priority value is determined.

If a priority value has not been overridden, then no change is made to the current priority value (Step 810). However, if the priority value has been overridden, then the override value is sent to the prioritization agent or engine (Step 812). In one embodiment, overriding the priority does not cause a change in the priority value, but rather causes the dirty region having the next highest priority value to be sent in lieu of the dirty region having the overridden priority value. For example, if the priority value associated with a first dirty region is higher than the priority value associated with a second dirty region, but the priority value associated with the first dirty region is overridden; then the priority value associated with the second dirty region is sent to the client instead of the first dirty region.

The present disclosure may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, a computer readable medium having instructions executable by a processor, or a magnetic tape. In general, the computer-readable programs may be implemented in any programming language. Some examples of languages that can be used include C, C++, C#, or JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompany claims and their equivalents.

What is claimed is:

1. A method for identifying modified sections of a drawing region and selecting at least one modified drawing region section to transmit to a remote computer, the method comprising:

identifying, by a prioritization module executing on a local computer, a first modified drawing region section, the first modified drawing region section generated by a first application identifying, by the prioritization module, a second modified drawing region section, the second modified drawing region section generated by a second application;

intercepting a drawing command generated by the first application, the drawing command comprising information about the first modified drawing region section;

determining, by the prioritization module, whether a first priority corresponding to the first modified drawing region section is greater than a second priority corresponding to the second modified drawing region section;

selecting, by the prioritization module responsive to the determination, one of the first modified drawing region section and the second modified drawing region section, where the selected modified drawing region section corresponds to the greater of the first priority and the second priority; and transmitting the selected modified drawing region section to a remote computer communicating with the local computer.

2. The method of claim 1, wherein:

identifying the first modified drawing region section further comprises identifying a first modified drawing region section displayed in a first window, and identifying the second modified drawing region section further comprises identifying a second modified drawing region section display in a second window.

3. The method of claim 2, wherein determining whether the first priority is greater than the second priority further comprises determining whether the first window or the second window has focus.

4. The method of claim 1, wherein:
identifying the first modified drawing region section further comprises identifying a first modified drawing region section displayed on a first display device, and
identifying the second modified drawing region section further comprises identifying a second modified drawing region section display on a second display device.

5. The method of claim 4, wherein determining whether the first priority is greater than the second priority further comprises determining whether the first display device or the second display device has focus.

6. The method of claim 1, wherein:
identifying the first modified drawing region section further comprises identifying a first modified drawing region section of a drawing region, and
identifying the second modified drawing region section further comprises identifying a second modified drawing region section of the drawing region.

7. The method of claim 6, wherein the drawing region comprises a desktop.

8. The method of claim 1, further comprising using the drawing command information to identify a location of the first modified drawing region section within a drawing region.

9. A method for identifying modified sections of a drawing region and selecting at least one modified drawing region section to transmit to a remote computer, the method comprising:
identifying, by a prioritization module executing on a local computer, a first modified drawing region section, the first modified drawing region section generated by a first application
identifying, by the prioritization module, a second modified drawing region section, the second modified drawing region section generated by a second application;
determining, by the prioritization module, whether a first priority corresponding to the first modified drawing region section is greater than a second priority corresponding to the second modified drawing region section;
selecting, by the prioritization module responsive to the determination, one of the first modified drawing region section and the second modified drawing region section, where the selected modified drawing region section corresponds to the greater of the first priority and the second priority; and
transmitting the selected modified drawing region section to a remote computer communicating with the local computer, wherein transmitting the selected modified drawing region section further comprises streaming the selected modified drawing region section to the remote computer.

10. A system for identifying modified sections of a drawing region and selecting at least one modified drawing region section to transmit to a remote computer, the system comprising:
a first modified drawing region section generated by a first application and having a first priority;
a second modified drawing region section generated by a second application and having a second priority;
a prioritization module executing on a local computer to:
identify the first modified drawing region section,
identify the second modified drawing region section,
intercept a drawing command generated by the first application, the drawing command comprising information about the first modified drawing region section,
determine whether the first priority is greater than the second priority,
select one of the first modified drawing region section and the second modified drawing region section, where the selected modified drawing region section corresponds to the greater of the first priority and the second priority, and
transmit the selected modified drawing region section to a remote computer communicating with the local computer.

11. The system of claim 10, wherein the first modified drawing region section is displayed in a first window, and the second modified drawing region section is displayed in a second window.

12. The system of claim 11, wherein the prioritization module determines whether the first priority is greater than the second priority by determining whether the first window or the second window has focus.

13. The system of claim 10, wherein the first modified drawing region section is displayed on a first display device, and the second modified drawing region section is displayed on a second display device.

14. The system of claim 13, wherein the prioritization module determines whether the first priority is greater than the second priority by determining whether the first display device or the second display device has focus.

15. The system of claim 10, further comprising a drawing region comprising the first modified drawing region section and the second modified drawing region section.

16. The system of claim 15, wherein the drawing region comprises a desktop.

17. The system of claim 10, wherein the prioritization module uses the drawing command information to identify a location of the first modified drawing region section within a drawing region.

18. A system for identifying modified sections of a drawing region and selecting at least one modified drawing region section to transmit to a remote computer, the system comprising:
a first modified drawing region section generated by a first application and having a first priority;
a second modified drawing region section generated by a second application and having a second priority;
a prioritization module executing on a local computer to:
identify the first modified drawing region section,
identify the second modified drawing region section,
determine whether the first priority is greater than the second priority,
select one of the first modified drawing region section and the second modified drawing region section, where the selected modified drawing region section corresponds to the greater of the first priority and the second priority, and
transmit the selected modified drawing region section to a remote computer communicating with the local computer, wherein the local computer streams the selected modified drawing region section to the remote computer.

19. The method of claim 9, wherein:
identifying the first modified drawing region section further comprises identifying a first modified drawing region section displayed in a first window, and identifying the second modified drawing region section further comprises identifying a second modified drawing region section display in a second window.

20. The method of claim 19, wherein determining whether the first priority is greater than the second priority further comprises determining whether the first window or the second window has focus.

21. The method of claim 9, wherein:
identifying the first modified drawing region section further comprises identifying a first modified drawing region section displayed on a first display device, and
identifying the second modified drawing region section further comprises identifying a second modified drawing region section display on a second display device.

22. The method of claim 21, wherein determining whether the first priority is greater than the second priority further comprises determining whether the first display device or the second display device has focus.

23. The method of claim 9, wherein:
identifying the first modified drawing region section further comprises identifying a first modified drawing region section of a drawing region, and
identifying the second modified drawing region section further comprises identifying a second modified drawing region section of the drawing region.

24. The method of claim 23, wherein the drawing region comprises a desktop.

25. The method of claim 9, further comprising intercepting a drawing command generated by the first application, the drawing command comprising information about the first modified drawing region section.

26. The method of claim 25, further comprising using the drawing command information to identify a location of the first modified drawing region section within a drawing region.

27. The system of claim 18, wherein the first modified drawing region section is displayed in a first window, and the second modified drawing region section is displayed in a second window.

28. The system of claim 27, wherein the prioritization module determines whether the first priority is greater than the second priority by determining whether the first window or the second window has focus.

29. The system of claim 18, wherein the first modified drawing region section is displayed on a first display device, and the second modified drawing region section is displayed on a second display device.

30. The system of claim 29, wherein the prioritization module determines whether the first priority is greater than the second priority by determining whether the first display device or the second display device has focus.

31. The system of claim 18, further comprising a drawing region comprising the first modified drawing region section and the second modified drawing region section.

32. The system of claim 21, wherein the drawing region comprises a desktop.

33. The system of claim 18, wherein the prioritization module intercepts a drawing command generated by the first application, the drawing command comprising information about the first modified drawing region section.

34. The system of claim 33, wherein the prioritization module uses the drawing command information to identify a location of the first modified drawing region section within a drawing region.

* * * * *